US009667893B2

(12) United States Patent
Kimura et al.

(10) Patent No.: US 9,667,893 B2
(45) Date of Patent: May 30, 2017

(54) NOISE REMOVING DEVICE AND IMAGING DEVICE

(71) Applicant: Kabushiki Kaisha Toshiba, Minato-ku (JP)

(72) Inventors: Shunsuke Kimura, Kawasaki (JP); Hideyuki Funaki, Shinagawa (JP); Ikuo Fujiwara, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 268 days.

(21) Appl. No.: 14/531,146

(22) Filed: Nov. 3, 2014

(65) Prior Publication Data
US 2015/0136952 A1    May 21, 2015

(30) Foreign Application Priority Data
Nov. 19, 2013  (JP) ................................. 2013-239311

(51) Int. Cl.
| | | |
|---|---|---|
| *H04N 5/363* | (2011.01) | |
| *H01L 27/146* | (2006.01) | |
| *H04N 5/378* | (2011.01) | |
| *H04N 5/357* | (2011.01) | |

(52) U.S. Cl.
CPC ........... *H04N 5/363* (2013.01); *H04N 5/3575* (2013.01); *H04N 5/378* (2013.01)

(58) Field of Classification Search
CPC ...... H04N 5/363; H04N 5/378; H04N 5/3575; H04N 5/357; H04N 5/3577; H01L 27/146; H01L 27/14643
See application file for complete search history.

(56) References Cited

U.S. PATENT DOCUMENTS

| | | | | |
|---|---|---|---|---|
| RE30,087 E | * | 8/1979 | White | G11C 19/285 257/248 |
| 5,299,032 A | * | 3/1994 | Kurita | G11C 19/285 327/551 |
| 5,434,619 A | * | 7/1995 | Yonemoto | H04N 5/365 348/241 |
| 5,801,555 A | * | 9/1998 | Kwon | H04N 5/3575 327/94 |

(Continued)

FOREIGN PATENT DOCUMENTS

| | | |
|---|---|---|
| JP | 2000-253316 | 9/2000 |
| JP | 2003-46869 A | 2/2003 |

(Continued)

OTHER PUBLICATIONS

Office Action issued Sep. 7, 2015 in Korean Patent Application No. 10-2014-0155315 (with English language translation).

*Primary Examiner* — John Lee
(74) *Attorney, Agent, or Firm* — Oblon, McClelland, Maier & Neustadt, L.L.P.

(57) ABSTRACT

According to an embodiment, a noise removing device includes a first difference detector and a second difference detector. The first difference detector detects a difference between a first reset signal at a first timing and a second reset signal at a second timing after a predetermined period of time has elapsed from the first timing. The second difference detector subtracts the difference detected by the first difference detector from a main signal between the first reset signal and the second reset signal, and outputs a subtraction result.

8 Claims, 6 Drawing Sheets

(56) References Cited

U.S. PATENT DOCUMENTS

| | | | | |
|---|---|---|---|---|
| 5,892,540 | A * | 4/1999 | Kozlowski | H04N 5/3658 250/208.1 |
| 6,018,364 | A * | 1/2000 | Mangelsdorf | H04N 5/3575 348/241 |
| 6,476,864 | B1 * | 11/2002 | Borg | H01L 27/14609 257/E27.132 |
| 6,950,137 | B1 * | 9/2005 | Tanaka | H04N 5/3575 348/308 |
| 2002/0098823 | A1 * | 7/2002 | Lindfors | H03H 19/004 455/334 |
| 2003/0025817 | A1 * | 2/2003 | Yonemoto | H04N 5/361 348/308 |
| 2003/0085402 | A1 * | 5/2003 | Tay | H04N 1/32358 257/72 |
| 2004/0239791 | A1 * | 12/2004 | Mabuchi | H04N 3/155 348/315 |
| 2006/0077273 | A1 * | 4/2006 | Lee | H04N 5/363 348/308 |
| 2007/0046797 | A1 * | 3/2007 | Kakumoto | H04N 5/335 348/294 |
| 2008/0258045 | A1 * | 10/2008 | Oike | H04N 5/3559 250/208.1 |
| 2010/0002094 | A1 * | 1/2010 | Solhusvik | H04N 5/2355 348/230.1 |
| 2010/0201824 | A1 * | 8/2010 | Wei | H04N 21/42646 348/180 |
| 2010/0289932 | A1 * | 11/2010 | Hashimoto | H04N 5/2176 348/300 |
| 2011/0001039 | A1 * | 1/2011 | Hoshino | H03M 1/144 250/208.1 |
| 2011/0304757 | A1 * | 12/2011 | Egawa | H04N 5/355 348/300 |
| 2012/0038807 | A1 * | 2/2012 | Ackland | H04N 5/3575 348/300 |
| 2012/0162484 | A1 * | 6/2012 | Mo | H04N 5/2176 348/241 |
| 2013/0107094 | A1 | 5/2013 | Yamamoto et al. | |
| 2014/0028883 | A1 * | 1/2014 | Shin | H04N 13/0271 348/297 |
| 2014/0124648 | A1 * | 5/2014 | Yin | H01L 27/14609 250/208.1 |
| 2014/0239153 | A1 * | 8/2014 | Gelfand | H04N 5/378 250/208.1 |
| 2015/0136952 | A1 * | 5/2015 | Kimura | H04N 5/363 250/208.1 |

FOREIGN PATENT DOCUMENTS

| | | |
|---|---|---|
| JP | 2004-266597 | 9/2004 |
| JP | 2007-97127 A | 4/2007 |
| JP | 2008-16612 | 1/2008 |
| JP | 2012-19167 | 1/2012 |
| WO | WO 2012/004940 A1 | 1/2012 |

* cited by examiner

NOISE REMOVING DEVICE AND IMAGING DEVICE

CROSS-REFERENCE TO RELATED APPLICATIONS

This application is based upon and claims the benefit of priority from Japanese Patent Application No. 2013-239311, filed on Nov. 19, 2013; the entire contents of which are incorporated herein by reference.

FIELD

Embodiments described herein relate generally to a noise removing device and an imaging device.

BACKGROUND

In the still-image imaging devices or the moving-image imaging devices available these days, the pixels of an image sensor such as a CMOS image sensor are refined to achieve multi-pixels with the aim of achieving a higher resolution. More particularly, the number of transistors constituting a pixel is reduced, and a three-transistor pixel configuration or a four-transistor pixel configuration is adopted so as to refine the pixels of the image sensor.

In the case of an image sensor having a four-transistor pixel configuration, reading of a pixel signal is performed after resetting, and the result is subjected to correlated double sampling (CDS). That makes it possible to remove the noise.

However, in the case of an image sensor having a three-transistor pixel configuration without a transfer gate, firstly reading of a pixel signal is performed followed by resetting. Hence, it becomes difficult to perform correlated double sampling. For that reason, in an image sensor having a three-transistor pixel configuration, the reset noise (kTC noise) occurring due to a reset transistor remains without being removed. Besides, in an image sensor having a three-transistor pixel configuration, the 1/f noise that occurs due to the amplifier transistor and that is superimposed on the reset voltage over long intervals of a frame period remains without being removed. For that reason, in an image sensor having a three-transistor pixel configuration, there is a poor signal-to-noise ratio (SN ratio) of the pixel signals.

Of such noises, the kTC noise can be removed by means of the active resetting method. However, removing the 1/f noise is a difficult task. Hence, there has been a demand for enabling removal of the 1/f noise and achieving enhancement in the signal-to-noise ratio of the pixel signals.

DETAILED DESCRIPTION

According to an embodiment, a noise removing device includes a first difference detector and a second difference detector. The first difference detector detects a difference between a first reset signal at a first timing and a second reset signal at a second timing after a predetermined period of time has elapsed from the first timing. The second difference detector subtracts the difference detected by the first difference detector from a main signal between the first reset signal and the second reset signal, and outputs a subtraction result.

Various embodiments are described below in detail with reference to the accompanying drawings.

First Embodiment

Figure 1:
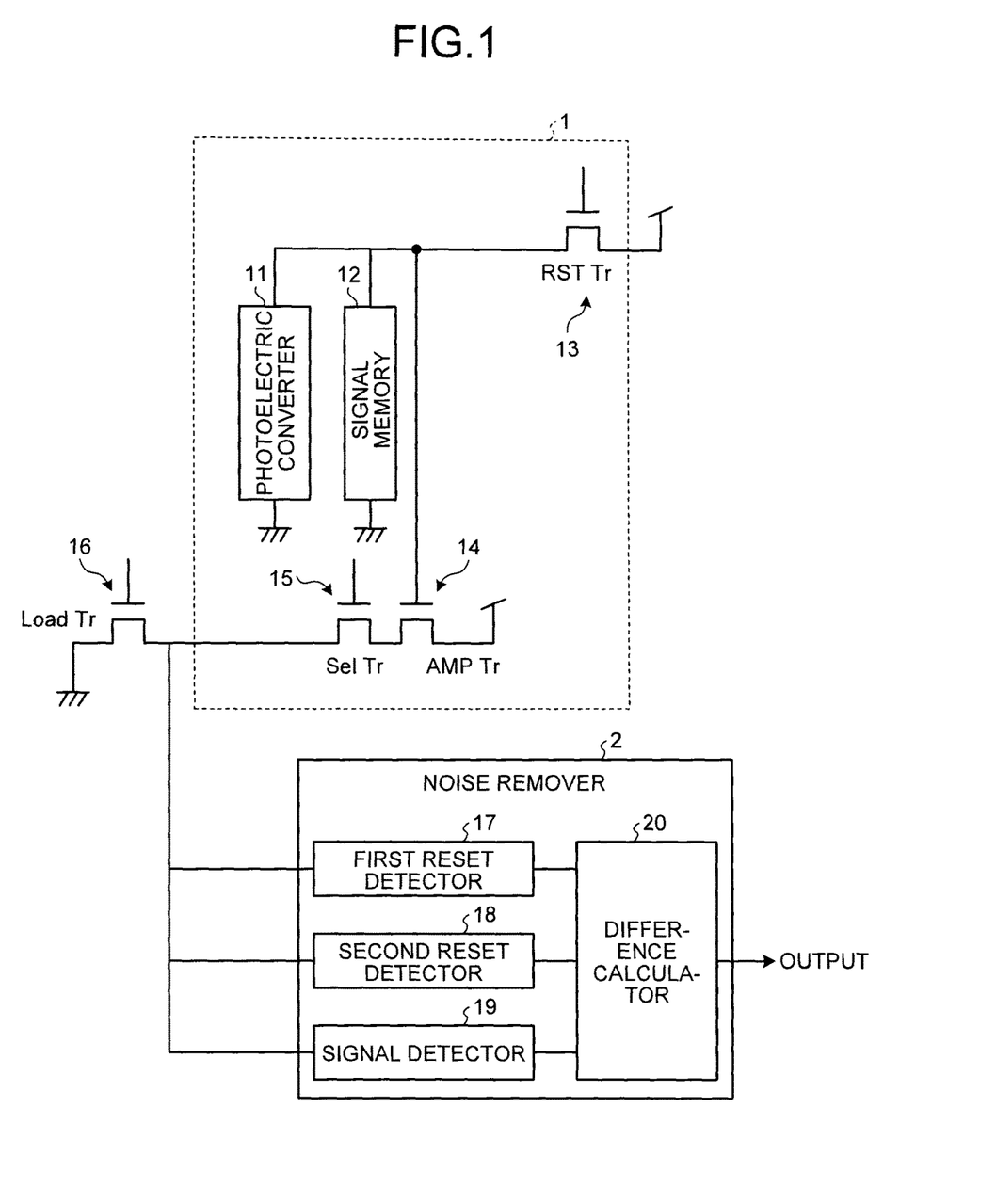
FIG. 1 is a block diagram of an imaging device according to a first embodiment.

FIG. 1 is a block diagram illustrating the relevant part of an imaging device according to a first embodiment in which a noise removing device and the imaging device are implemented. As illustrated in FIG. 1, the imaging device according to the first embodiment includes a plurality of pixels 1 used in capturing a photographic subject, and includes a noise remover 2 that removes noise from the pixel signals read from each pixel 1.

Each pixel 1 includes a photoelectric converter 11, and includes a signal memory 12 that is an example of a photoelectric signal memory. The photoelectric converter 11 converts imaging light into electrical charge (pixel signals). As the photoelectric converter 11, it is possible to use a CMOS image sensor having an organic photoelectric conversion film. Alternatively, as the photoelectric converter 11, it is possible to use an image sensor having an inorganic photoelectric conversion film. Still alternatively, as the photoelectric converter 11, it is possible to use a hybrid image sensor having an organic photoelectric conversion film and an inorganic photoelectric conversion film. The signal memory 12 is, for example, floating diffusion (FD) and is used to temporarily store therein the pixel signals generated in the photoelectric converter 11.

Each pixel 1 has a three-transistor configuration that includes a reset transistor (RST Tr) 13, an amplifier transistor (AMP Tr) 14, and a select transistor (Sel Tr) 15. The reset transistor 13 performs control to reset the signal memory 12. The amplifier transistor 14 amplifies the pixel signals, which are read from the signal memory 12, with a predetermined gain. The select transistor 15 performs control to select the amplifier transistor 14, which amplifies the pixel signals.

Each pixel 1 is connected to a load transistor (Load Tr) 16 that is disposed on the outside of that pixel 1. The load transistor 16 is an example of a load transistor. The load transistor 16 performs control to select the pixel used in reading the pixel signals, and drives the corresponding amplifier transistor 14.

The noise remover 2 includes a first reset detector 17, a second reset detector 18, a signal detector 19, and a difference calculator 20. The first reset detector 17 is an example of a previous-frame reset signal detector, and detects the reset signal of the previous frame. The second reset detector 18 is an example of a current-frame reset signal detector, and detects the reset signal of the current frame. The signal detector 19 is an example of a current-frame signal detector, and detects the pixel signal of the current frame. The difference calculator 20 is an example of a difference calculator that performs computing operations using the reset signal of the previous frame, the reset signal of the current frame, and the pixel signal of the current frame, to thereby remove inter-frame 1/f noise from the pixel signal of the current frame before outputting the pixel signal.

Figure 2:
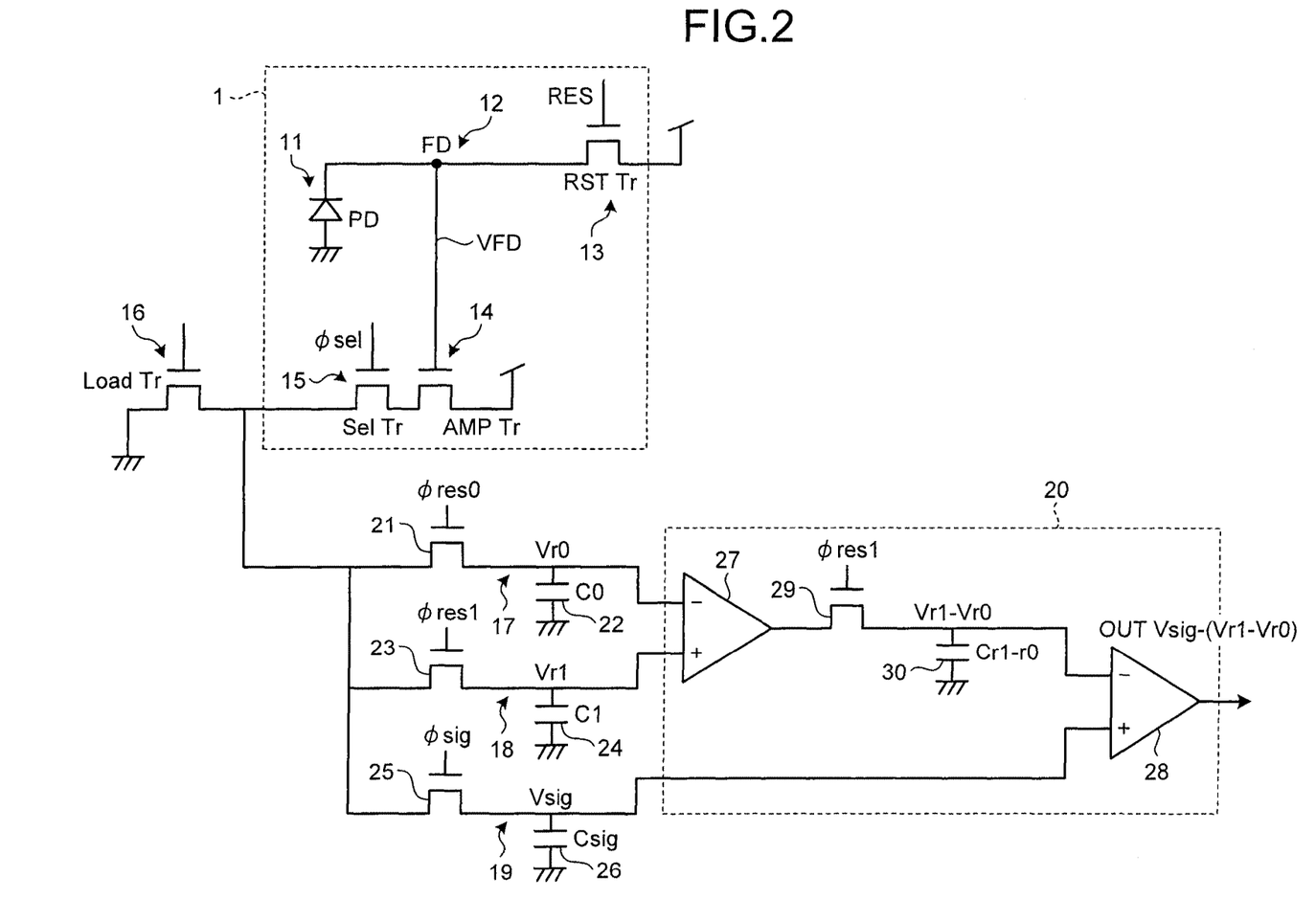
FIG. 2 is a circuit diagram of the imaging device according to the first embodiment.

FIG. 2 is a circuit diagram of the imaging device according to the first embodiment. As illustrated in FIG. 2, the first reset detector 17 includes a first transistor 21 and a first capacitor 22 for the purpose of sampling the reset signals of the previous frame. As an example, a field effect transistor (TFT) is used as the first transistor 21. The source of the first transistor 21 is connected in between the connection between the load transistor (Load Tr) 16 and the select transistor (Sel Tr) 15 of the pixel 1, and is supplied with the pixel signals read by the pixel 1.

The first capacitor (C0) 22 has one end thereof connected between the drain of the first transistor 21 and the inverting input terminal (−) of a first comparator 27 (described later). The first capacitor (C0) 22 holds a reset signal (Vr0) of the previous frame that has been sampled by the first transistor 21, and supplies the reset signal (Vr0) to the inverting input terminal (−) of the first comparator 27.

The second reset detector 18 includes a second transistor 23 and a second capacitor 24 for the purpose of sampling the reset signal of the current frame. As an example, a field effect transistor (TFT) is used as the second transistor 23. The source of the second transistor 23 is connected in between the connection between the load transistor (Load Tr) 16 and the select transistor (Sel Tr) 15 of the pixel 1, and is supplied with the pixel signals read by the pixel 1.

The second capacitor (C1) 24 has one end thereof connected between the drain of the second transistor 23 and the non-inverting input terminal (+) of the first comparator 27 (described later). The second capacitor (C1) 24 holds a reset signal (Vr1) of the current frame that has been sampled by the second transistor 23, and supplies the reset signal (Vr1) to the non-inverting input terminal (+) of the first comparator 27.

The signal detector 19 includes a third transistor 25 and a third capacitor 26 for the purpose of sampling the pixel signal of the current frame. As an example, a field effect transistor (TFT) is used as the third transistor 25. The source of the third transistor 25 is connected in between the connection between the load transistor (Load Tr) 16 and the select transistor (Sel Tr) 15 of the pixel 1, and is supplied with the pixel signals read by the pixel 1.

The third capacitor (Csig) 26 has one end thereof connected between the drain of the third transistor 25 and the non-inverting input terminal (+) of a second comparator 28 (described later). The third capacitor (Csig) 26 holds a pixel signal (Vsig) of the current frame that has been sampled by the third transistor 25, and supplies the pixel signal (Vsig) to the non-inverting input terminal (+) of the second comparator 28.

The difference calculator 20 includes the first comparator 27, the second comparator 28, a fourth transistor 29, and a fourth capacitor 30. The first comparator 27 detects the difference between the reset signal (Vr0) of the previous frame and the reset signal (Vr1) of the current frame (i.e., detects an offset error between reset electrical potentials that is caused due to the 1/f noise occurring between the frames). The fourth transistor 29 and the fourth capacitor 30 sample and hold the difference between the reset signal (Vr0) of the previous frame and the reset signal (Vr1) of the current frame, and then supply the difference to the inverting input terminal (−) of the second comparator 28. Then, the second comparator 28 subtracts the offset error between reset electrical potentials from the pixel signal of the current frame, to thereby generate a pixel signal from which the inter-frame 1/f noise is removed; and supplies the pixel signal to a signal processing circuit disposed at a subsequent stage.

The imaging device according to the first embodiment includes a first difference detector that detects the difference between a first reset signal at a first timing and a second reset signal at a second timing after a predetermined period of time is elapsed from the first timing. Moreover, the imaging device according to the first embodiment includes a second difference detector that subtracts the difference detected by the first difference detector from the main signal between the first reset signal and the second reset signal, and outputs the subtraction result. As an example, the first reset signal at the first timing corresponds to the reset signal (Vr0) of the previous frame, while the second reset signal at the second timing corresponds to the reset signal (Vr1) of the current frame. Meanwhile, as an example, the first difference detector can be implemented using the first transistor 21, the first capacitor 22, the second transistor 23, the second capacitor 24, and the first comparator 27. Moreover, the main signal between the first reset signal and the second reset signal corresponds to the pixel signal (Vsig) of the current frame. Furthermore, as an example, the second difference detector can be implemented using the third transistor 25, the third capacitor 26, and the second comparator 28.

The first difference detector further includes a first sample holder that samples and holds the first reset signal, a second sample holder that samples and holds the second reset signal, and a first comparator that detects the difference between the sampled-and-held first reset signal and the sampled-and-held second reset signal. Herein, as an example, the first sample holder can be implemented using the first transistor 21 and the first capacitor 22. Similarly, as an example, the second sample holder can be implemented using the second transistor 23 and the second capacitor 24. Moreover, the first comparator corresponds to the first comparator 27.

The second difference detector includes a third sample holder that samples and holds the main signal, and a second comparator that subtracts the difference output by the first comparator from the sampled-and-held main signal and outputs the resultant signal. As an example, the third sample holder can be implemented using the third transistor 25 and the third capacitor 26. Moreover, the second comparator corresponds to the second comparator 28.

Figure 3:
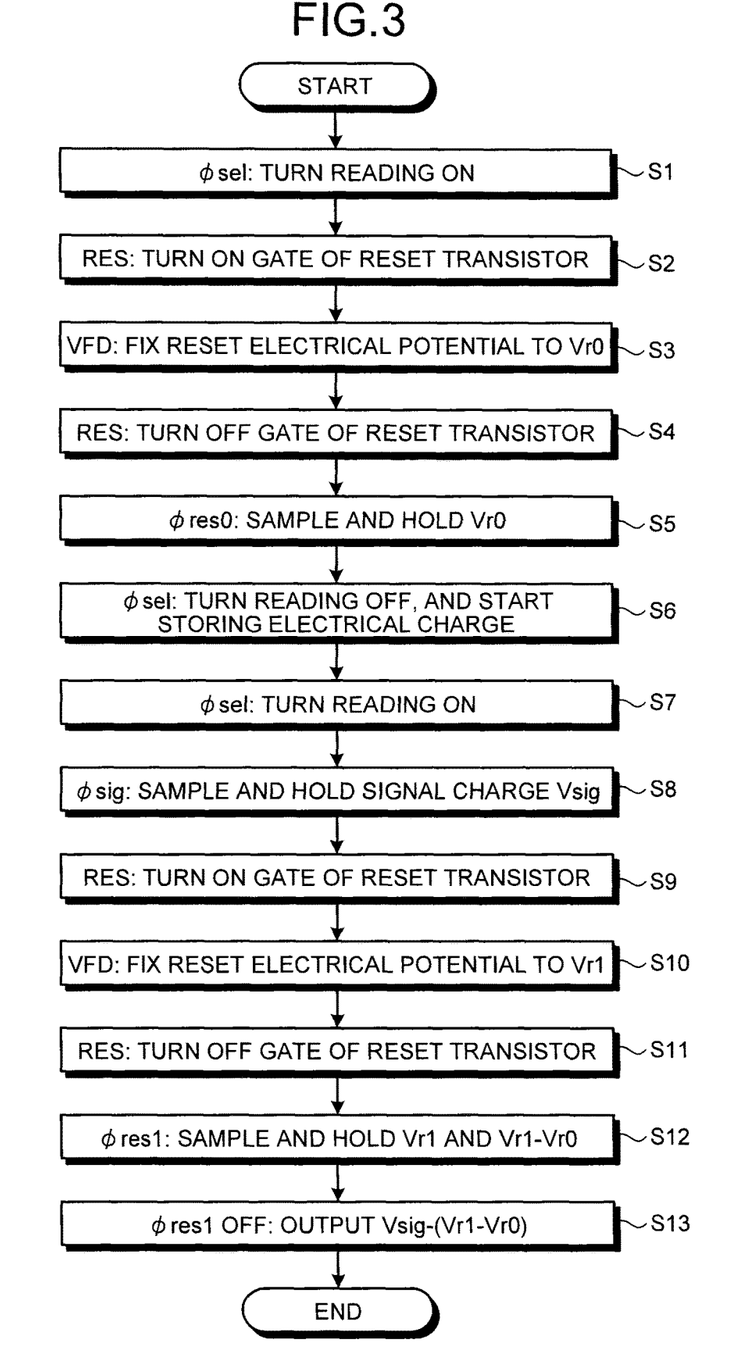
FIG. 3 is a flowchart for explaining a sequence of operations in a noise removing operation performed in the imaging device according to the first embodiment.
Figure 4:
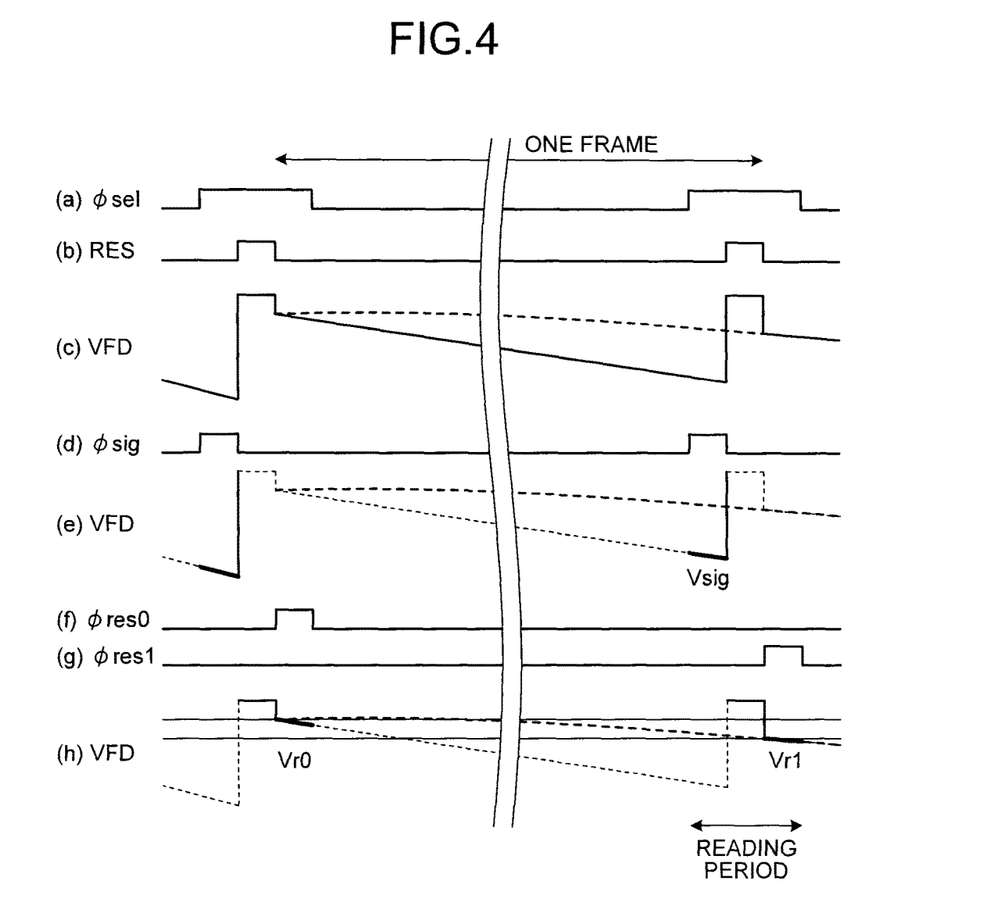
FIG. 4 is a timing chart illustrating waveforms of the constituent elements of the imaging device according to the first embodiment.

FIG. 3 is a flowchart for explaining a sequence of operations performed in the imaging device according to the first embodiment for the purpose of generating pixel signals from which the 1/f noise is removed. In FIG. 4 are illustrated signal waveforms of the constituent elements of the imaging device illustrated in FIGS. 1 and 2 according to the first embodiment. In FIG. 4, the signal waveform (a) is a read control signal waveform (ϕsel) that, during the period of reading a pixel signal, sets the gate voltage of the select transistor 15 to a high level. Moreover, in FIG. 4, the signal waveform (b) is a reset signal waveform (RES) that, during a reset period within the period of reading a pixel signal, sets the gate voltage of the reset transistor 13 to the high level.

Furthermore, in FIG. 4, the signal waveform (c) is a voltage waveform (VFD) of a pixel signal read from the signal memory (FD) 12. Moreover, in FIG. 4, the signal waveform (d) is a pixel sampling signal waveform (ϕsig) that, during a pixel signal sampling period starting from the start timing of the reading period to the timing at which the reset signal is set to the high level, sets the gate voltage of the third transistor 25 to the high level.

Furthermore, in FIG. 4, the signal waveform (e) is a waveform of a pixel signal (VFD) that is read from the pixel 1 and supplied to the third transistor 25. Of that pixel signal, that portion (Vsig) is sampled which corresponds to the time of supplying a high-level pixel sampling signal (ϕsig). Moreover, in FIG. 4, the signal waveform (f) is a previous-reset sampling signal waveform (ϕres0) that, during a sampling period of the previous-frame reset signal which is within the period of reading the pixel signal of the previous frame and which starts from the timing of setting the high-level reset signal to a low level to the end of the reading period, sets the gate voltage of the first transistor 21 to the high level.

Furthermore, in FIG. 4, the signal waveform (g) is a current-reset sampling signal waveform (ϕres1) that, during a sampling period of the current-frame reset signal which is within the period of reading the pixel signal of the current frame and which starts from the timing of setting the high-level reset signal to the low level to the end of the reading period, sets the gate voltage of the second transistor 23 to the high level. Moreover, in FIG. 4, the signal waveform (h) is a voltage waveform (VFD) of a pixel signal read from the signal memory (FD) 12. Of that pixel signal, that portion (Vr0) is sampled which corresponds to the time of supplying a high-level previous reset sampling signal (res0) is sampled. Besides, of that pixel signal, that portion (Vr1) is sampled which corresponds to the time of supplying a high-level current reset sampling signal (ϕres1).

At Step S1 illustrated in the flowchart in FIG. 3, the read control signal waveform (ϕsel), which is set to the high level during the period of reading a pixel signal, is supplied to the select transistor 15. As a result, while the high-level read control signal waveform (ϕsel) is being supplied to the gate, the select transistor 15 performs an ON operation, and the pixel signal stored in the signal memory 12 (VFD: see the waveform (c) in FIG. 4) is supplied to the first transistor 21, the second transistor 23, and the third transistor 25. The inter-frame 1/f noise that occurs at long intervals as illustrated with a dotted waveform is superimposed on the pixel signal illustrated in the waveform (c) in FIG. 4. The 1/f noise is present between the reset signals and appears like an offset. Moreover, if a single frame period is, for example, 30 fps, the 1/f noise is band-limited to 30 Hz or higher.

Then, as illustrated in the waveform (b) in FIG. 4, during the period of reading a pixel signal, the high-level reset signal is supplied to the gate of the reset transistor 13 for a predetermined period of time (Step S2). As a result, during the period of reading a pixel signal, while the high-level reset signal is being supplied, the reset transistor 13 performs an ON operation and the signal level of the pixel signal is fixed to the reset electrical potential (Vr0) of the previous frame (Step S3).

Subsequently, the high-level reset signal is switched to the low level so as to make the reset transistor 13 perform an OFF operation (Step S4). Moreover, as illustrated in the waveform (f) in FIG. 4, the previous-reset sampling signal (ϕres0), which is at the high level during the period of time that is within the period of reading the pixel signal and that starts from the timing of switching the high-level reset signal to the low level to the end of the reading period, is supplied to the gate of the first transistor 21 (Step S5). Then, as illustrated in the waveform (h) in FIG. 4, the reset signal (Vr0) of the previous frame is sampled. The first capacitor 22 holds the reset signal (Vr0) of the previous frame and supplies it to the inverting input terminal (−) of the first comparator 27.

Then, the high-level read control signal (ϕsel) that was supplied to the select transistor 15 is switched to the low level (Step S6). As a result, storing of the pixel signal in the signal memory (FD) is started.

Subsequently, the high-level read control signal (ϕsel) is supplied to the select transistor 15, thereby indicating the period of reading a pixel signal (Step S7). The pixel signal that is read is then supplied to the first transistor 21, the second transistor 23, and the third transistor 25.

Then, the gate of the third transistor 25 is supplied with the pixel sampling signal (ϕsig) that, as illustrated in the waveform (d) in FIG. 4, is set to the high level during the period of time starting from the start of the reading period until the reset signal is supplied to the reset transistor 13 (Step S8). As a result, as illustrated in the waveform (e) in FIG. 4, while the pixel sampling signal (ϕsig) is at the high level, the pixel signal (Vsig) is sampled. Then, the third capacitor 26 holds the sampled pixel signal (Vsig) and supplies it to the non-inverting input terminal (+) of the second comparator 28.

Subsequently, as illustrated in the waveform (b) in FIG. 4, during the period of reading a pixel signal, at the timing at which the pixel sampling signal (ϕsig) is switched to the low level, the high-level reset signal is supplied to the gate of the reset transistor 13 for a predetermined period of time (Step S9). As a result, during the period of reading the pixel signal, while the high-level reset signal is being supplied, the reset transistor 13 performs an ON operation. Thus, the signal level of the pixel signal is fixed to the reset electrical potential (Vr1) of the current frame (Step S10).

Then, the high-level reset signal is switched to the low level so as to make the reset transistor 13 perform an OFF operation (Step S11).

Subsequently, as illustrated in the waveform (g) in FIG. 4, the current-reset sampling signal (ϕres1), which is at the high level during the period of time which is within the period of reading the pixel signal and which starts from the timing of switching the high-level reset signal to the low level to the end of the reading period, is supplied to the gate of the second transistor 23 and the gate of the fourth transistor 29 (Step S12).

The second transistor 23 samples the reset signal (Vr1) of the current frame as illustrated in the waveform (h) in FIG. 4. Moreover, the second capacitor 24 holds the reset signal (Vr1) of the current frame and supplies it to the non-inverting input terminal (+) of the first comparator 27.

The first comparator 27 detects the difference between the reset signal (Vr0) of the previous frame and the reset signal (Vr1) of the current frame illustrated in the waveform (h) in FIG. 4 (i.e., detects the offset error (Vr1−Vr0) between reset electrical potentials that is caused due to the inter-frame 1/f noise). The fourth transistor 29 samples the offset error with the current-reset sampling signal (ϕres1) illustrated in the waveform (g) in FIG. 4. The fourth capacitor 30 holds the offset error that has been sampled. Then, the offset error (Vr1−Vr0) that has been held by the fourth capacitor 30 is supplied to the inverting input terminal (−) of the second comparator 28.

Subsequently, from the pixel signal (Vsig) that is sampled and held by the third transistor 25 and the third capacitor 26, the second comparator 28 subtracts the offset error that is sampled and held by the fourth transistor 29 and the fourth capacitor 30 (Step S13). The subtraction performed by the second comparator 28 can be expressed by a mathematic expression of "Vsig−(Vr1−Vr0)". As a result, the 1/f noise that is superimposed on the pixel signal over long intervals can be removed from the pixel signal.

As is clear from the explanation given above, the imaging device according to the first embodiment includes the photoelectric converter 11 and includes the signal memory 12 that is used in storing the pixel signals obtained by conversion by the photoelectric converter 11. Moreover, the imaging device according to the first embodiment includes a pixel array having a plurality of pixels 1, each of which has a three-transistor configuration including the reset transistor 13, the amplifier transistor 14, and the select transistor 15; and having the load transistor 16 that drives the amplifier transistor 14. The reset transistor 13 resets the signal memory 12. The amplifier transistor 14 reads the pixel signals stored in the signal memory 12. The select transistor 15 selects the amplifier transistor 14.

Moreover, the imaging device according to the first embodiment includes the first reset detector 17 that detects the reset signal of the previous frame of each pixel 1; the second reset detector 18 that detects the reset signal of the current frame of each pixel 1; and the signal detector 19 that detects the pixel signal of the current frame.

In the imaging device according to the first embodiment, the difference calculator 20 calculates the difference between the reset signal of the previous frame and the reset signal of the current frame. That enables detection of the offset error between reset electrical potentials that is caused due to the 1/f noise occurring between the previous frame and the current frame. Then, the difference calculator 20 subtracts the detected offset error from the pixel signal of the current frame. As a result, it becomes possible to remove the inter-frame 1/f noise of the amplifier transistor, and to generate and output pixel signals having a high signal-to-noise ratio (SN ratio).

Second Embodiment

Given below is the explanation of an imaging device according to a second embodiment. In the imaging device according to the first embodiment, the offset error between reset electrical potentials, which is caused due to the 1/f noise occurring between the previous frame and the current frame, is detected. Then, the offset error is subtracted from the pixel signal of the current frame. As a result, the 1/f noise is removed from the pixel signal.

In contrast, in the imaging device according to the second embodiment, firstly, the pixel signal of the current frame is subtracted from the reset signal of the current frame; and then the subtraction output is subtracted from the reset signal of the previous frame. Consequently, eventually, a pixel signal is obtained from which the 1/f noise is removed. The second embodiment differs from the first embodiment in only this point. Hence, the following explanation is given only about the differences in the two embodiments, and the common explanation is not repeated.

Figure 5:
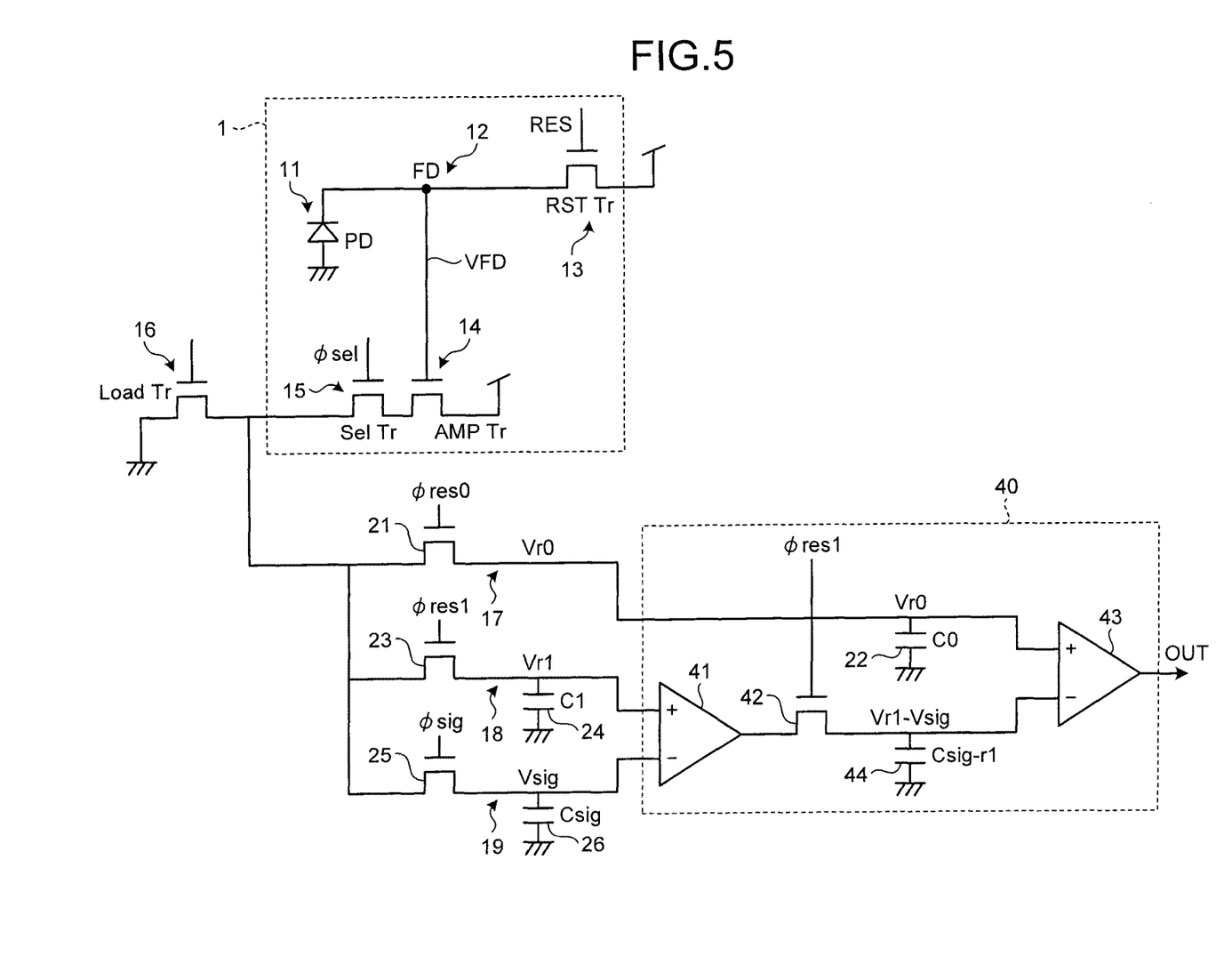
FIG. 5 is a circuit diagram of the imaging device according to a second embodiment.

In FIG. 5 is illustrated the relevant part of the imaging device according to the second embodiment. As illustrated in FIG. 5, in the imaging device according to the second embodiment, a difference calculator 40 includes a first comparator 41 that detects the difference between the reset signal of the current frame and the pixel signal of the current frame; and includes a transistor 42 and a capacitor 44 that sample and hold the difference output from the first comparator 41. Moreover, in the imaging device according to the second embodiment, the difference calculator 40 includes a second comparator 43 that outputs the difference between the sampled-and-held difference output and the reset signal of the previous frame, and outputs the pixel signal from which the 1/f noise is removed.

The imaging device according to the second embodiment includes a first difference detector that detects the difference between a second reset signal at a second timing and the main signal between the second reset signal and a first reset signal at a first timing prior to the second timing by a predetermined amount of time; and includes a second difference detector that detects and outputs the difference between the difference detected by the first difference detector and the first reset signal. As an example, the first difference detector can be implemented using the second transistor 23, the second capacitor 24, the third transistor 25, the third capacitor 26, and the first comparator 41. Similarly, as an example, the second difference detector can be implemented using the first transistor 21, the first capacitor 22, and the second comparator 43.

Moreover, in the imaging device according to the second embodiment, the first difference detector includes a first sample holder that samples and holds the second reset signal, a second sample holder that samples and holds the main signal, and a first comparator that detects the difference between the sampled-and-held second reset signal and the sampled-and-held main signal. As an example, the first sample holder can be implemented using the second transistor 23 and the second capacitor 24. Similarly, as an example, the second sample holder can be implemented using the third transistor 25 and the third capacitor 26. Moreover, the first comparator corresponds to the first comparator 41.

In the imaging device according to the second embodiment, the second difference detector includes a third sample holder that samples and holds the first reset signal, and a second comparator that outputs the difference between the difference output by the first comparator and the sampled-and-held first reset signal. As an example, the third sample holder can be implemented using the first transistor 21 and the first capacitor 22. Moreover, the second comparator corresponds to the second comparator 43.

In the imaging device according to the second embodiment, the current-frame reset signal (Vr1) that has been sampled and held by the second transistor 23 and the second capacitor 24 is supplied to the non-inverting input terminal (+) of the first comparator 41. Moreover, the current-frame pixel signal (Vsig) that has been sampled and held by the third transistor 25 and the third capacitor 26 is supplied to the inverting input terminal (−) of the first comparator 41.

The first comparator 41 detects and outputs the difference (Vr1−Vsig) between the reset signal (Vr1) of the current frame and the pixel signal (Vsig) of the current frame. The transistor 42 and the capacitor 44 sample and hold the difference output (Vr1−Vsig) between the reset signal (Vr1) of the current frame and the pixel signal (Vsig) of the current frame, and supply the difference output (Vr1−Vsig) to the inverting input terminal (−) of the second comparator 43.

The non-inverting input terminal (+) of the second comparator 43 is supplied with the previous-frame reset signal (Vr0) that has been sampled and held by the first transistor 21 and the first capacitor 22. Then, the second comparator 43 outputs the difference between the reset signal (Vr0) of the previous frame and the sampled-and-held difference output (Vr1−Vsig). As a result, in an identical manner to the first embodiment, it becomes possible to generate and output the pixel signal from which the 1/f noise is removed. Thus, it becomes possible to achieve the same effect as the effect achieved in the first embodiment.

Third Embodiment

Given below is the explanation of an imaging device according to a third embodiment. The imaging device according to the embodiments described above removes the 1/f noise occurring between the frames. In the imaging device according to the third embodiment, in addition to removing the 1/f noise occurring between the frames, it is also possible to remove the kTC noise occurring in the source of the reset transistor. The third embodiment differs from the earlier embodiments in only this point. Hence, the following explanation is given only about the differences in the embodiments, and the common explanation is not repeated. Moreover, the technical idea of the third embodiment can be implemented in the imaging device according to the first embodiment as well as the imaging device according to the second embodiment. Given below is the explanation of an example in which the third embodiment is implemented in the imaging device according to the first embodiment.

Figure 6:
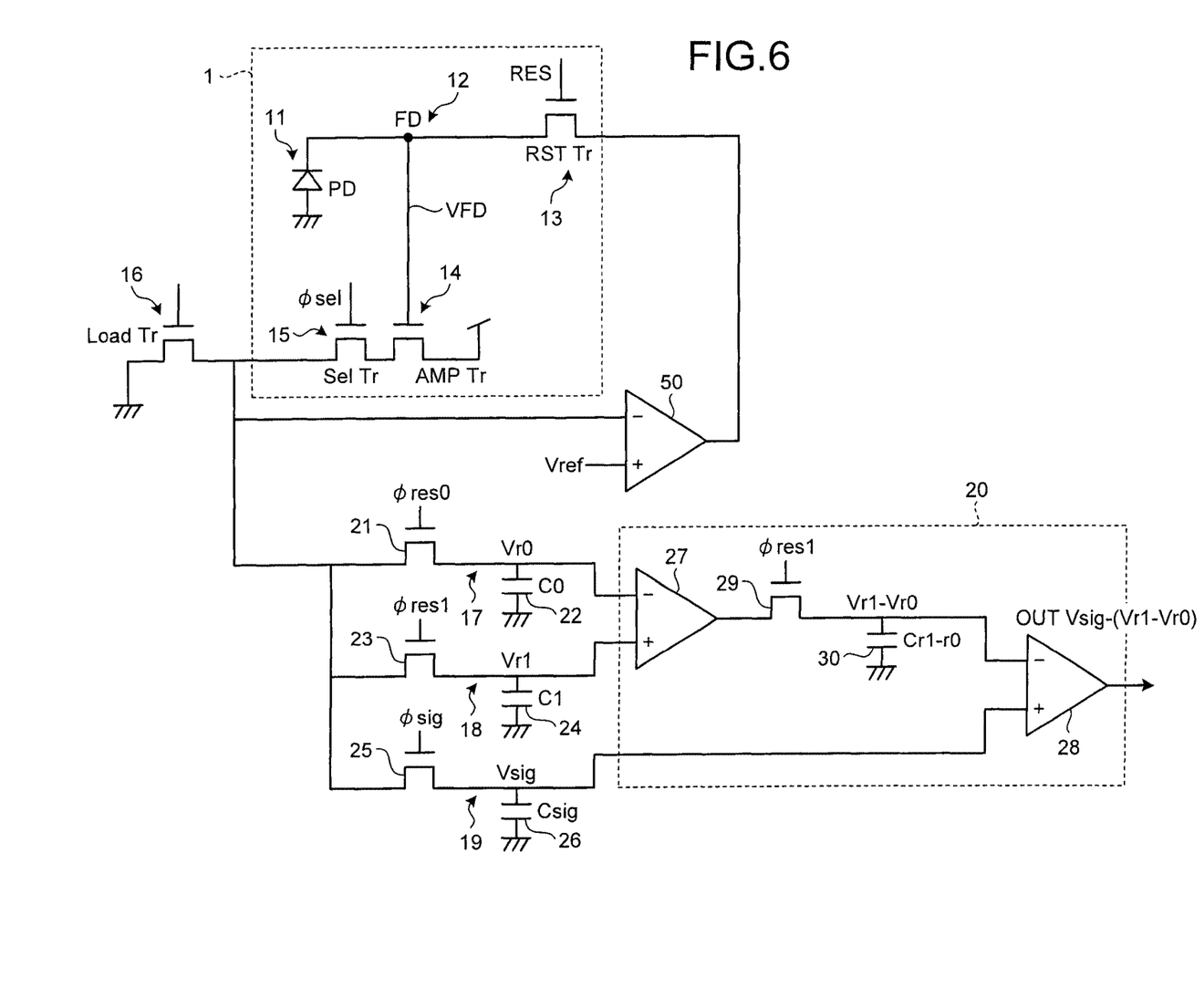
FIG. 6 is a circuit diagram of the imaging device according to a third embodiment.

In FIG. 6 is illustrated the relevant part of the imaging device according to the third embodiment. As illustrated in FIG. 6, in addition to the configuration of the imaging device according to the first embodiment, the imaging device according to the third embodiment includes an operational amplifier 50 for active resetting. The inverting input terminal (−) of the operational amplifier 50 is connected in between the select transistor 15 and the load transistor 16, and receives inverting input of the pixel signal read from the pixel 1. The non-inverting input terminal (+) of the operational amplifier 50 is supplied with a predetermined reference voltage (Vref). Moreover, the output terminal of the operational amplifier 50 is connected to the drain of the reset transistor 13.

The imaging device according to the third embodiment further includes a negative feedback unit that converts thermal noise (kTC noise), which is superimposed on the main signal, into a reverse phase and performs negative feedback to the source of supply of the main signal. As an example, the negative feedback unit can be implemented by connecting the output terminal of the operational amplifier 50 to the drain of the reset transistor 13 of the pixel 1.

In the imaging device having such a configuration according to the third embodiment, the kTC noise, which is the thermal noise generated at the source of the reset transistor 13, is supplied to the inverting input terminal (−) of the operational amplifier 50 and gets converted into a reverse phase. Then, the kTC noise, which has been converted into a reverse phase, is given as negative feedback to the drain of the reset transistor 13, thereby cancelling out the kTC noise occurring at the source of the reset transistor 13. As a result, it becomes possible to remove the kTC noise occurring at the source of the reset transistor 13.

In the imaging device according to the third embodiment, it not only becomes possible to remove the 1/f noise using the noise remover 2, but it also becomes possible to remove the kTC noise using the operational amplifier 50 for active resetting. For that reason, it becomes possible to generate and output pixel signals having a higher SN ratio, as well as to achieve the same effect as the effect achieved by the imaging device according to the earlier embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noise removing device comprising:
   a first difference detector configured to detect a difference between a first reset signal and a second reset signal, the first reset signal resetting, at a first timing, a photoelectric signal memory storing therein a main signal converted by a photoelectric converter, the second reset signal resetting the photoelectric signal memory at a second timing after the first timing; and
   a second difference detector configured to subtract the difference detected by the first difference detector from the main signal that is stored between the first timing and the second timing, and output a subtraction result.

2. The device according to claim 1, wherein
   the first difference detector comprises:
      a first sample holder configured to sample and hold the first reset signal;
      a second sample holder configured to sample and hold the second reset signal; and
      a first comparator configured to detect a difference between the sampled-and-held first reset signal and the sampled-and-held second reset signal, and
   the second difference detector comprises:
      a third sample holder configured to sample and hold the main signal; and
      a second comparator configured to subtract the difference detected by the first comparator from the sampled-and-held main signal, and output a subtraction result.

3. The device according to claim 1, further comprising a negative feedback unit configured to convert thermal noise, which is superimposed on the main signal, into a reverse phase and perform negative feedback to a supply source of the main signal.

4. An imaging device comprising:
   a plurality of pixels, each of which has a three-transistor configuration including
      a photoelectric converter,
      a photoelectric signal memory configured to store therein a main signal converted by the photoelectric converter,
      a reset transistor configured to reset the photoelectric signal memory with a first reset signal at a first timing or a second reset signal at a second timing after the first timing,
      an amplifier transistor configured to read the main signal stored in the photoelectric signal memory, and
      a select transistor configured to select the amplifier transistor;
   a load transistor configured to drive the amplifier transistor;
   a first difference detector configured to detect a difference between the first reset signal and the second reset signal; and
   a second difference detector configured to subtract the difference detected by the first difference detector from the main signal that is stored between the first timing and the second timing, and output a subtraction result.

5. A noise removing device comprising:
   a first difference detector configured to detect a difference between a second reset signal and a main signal, the main signal being converted by a photoelectric converter and being stored in a photoelectric signal memory between a first timing and a second timing after the first timing, the second reset signal resetting the photoelectric signal memory at the second timing; and a second difference detector configured to detect a difference between the difference detected by the first difference detector and a first reset signal that resets the photoelectric signal memory at the first timing, and output a detection result.

6. The device according to claim 5, wherein the first difference detector comprises:
   a first sample holder configured to sample and hold the second reset signal;
   a second sample holder configured to sample and hold the main signal; and
   a first comparator configured to detect a difference between the sampled-and-held second reset signal and the sampled-and-held main signal, and
the second difference detector comprises:
   a third sample holder configured to sample and hold the first reset signal; and
   a second comparator configured to output a difference between the difference detected by the first comparator and the sampled-and-held first reset signal.

7. The device according to claim 5, further comprising a negative feedback unit configured to convert thermal noise, which is superimposed on the main signal, into a reverse phase and perform negative feedback to a supply source of the main signal.

8. An imaging device comprising:
a plurality of pixels, each of which has a three-transistor configuration including
   a photoelectric converter,
   a photoelectric signal memory configured to store therein a main signal converted by the photoelectric converter,
   a reset transistor configured to reset the photoelectric signal memory with a first reset signal at a first timing or a second reset signal at a second timing after the first timing,
   an amplifier transistor configured to read the main signal stored in the photoelectric signal memory, and
   a select transistor configured to select the amplifier transistor;
a load transistor configured to drive the amplifier transistor;
a first difference detector configured to detect a difference between the second reset signal and the main signal that is stored in the photoelectric signal memory between the first timing and the second timing; and
a second difference detector configured to detect a difference between the difference detected by the first difference detector and the first reset signal, and output a detection result.

* * * * *